United States Patent
Uhrenholt et al.

(10) Patent No.: US 11,250,620 B2
(45) Date of Patent: Feb. 15, 2022

(54) GRAPHICS PROCESSING

(71) Applicant: Arm Limited, Cambridge (GB)

(72) Inventors: Olof Henrik Uhrenholt, Lomma (SE); Sandeep Kakarlapudi, Trondheim (NO)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/897,160

(22) Filed: Jun. 9, 2020

(65) Prior Publication Data
US 2021/0383600 A1 Dec. 9, 2021

(51) Int. Cl.
| | |
|---|---|
| *G06F 15/167* | (2006.01) |
| *G06T 15/80* | (2011.01) |
| *G06T 15/20* | (2011.01) |
| *G06F 9/48* | (2006.01) |
| *G06T 1/20* | (2006.01) |
| *G06T 15/00* | (2011.01) |
| *G06T 17/10* | (2006.01) |

(52) U.S. Cl.
CPC ............ *G06T 15/80* (2013.01); *G06F 9/4843* (2013.01); *G06T 1/20* (2013.01); *G06T 15/005* (2013.01); *G06T 15/205* (2013.01); *G06T 17/10* (2013.01)

(58) Field of Classification Search
CPC .... C07D 207/12; C07D 205/36; A61K 31/40; A61K 31/4015; A61K 31/455
USPC ........................................................ 548/541
See application file for complete search history.

(56) References Cited

U.S. PATENT DOCUMENTS

| | | | | |
|---|---|---|---|---|
| 2015/0178983 | A1* | 6/2015 | Akenine-Moller | ..... G06T 15/80 345/426 |
| 2018/0240268 | A1* | 8/2018 | Nevraev | ............... G06T 15/005 |
| 2018/0321938 | A1* | 11/2018 | Boswell | ............... G06F 9/3851 |
| 2019/0088009 | A1 | 3/2019 | Forey et al. | |
| 2019/0172257 | A1* | 6/2019 | Nevraev | ................ G06T 15/80 |

* cited by examiner

*Primary Examiner* — Gordon G Liu
(74) *Attorney, Agent, or Firm* — Vierra Magen Marcus LLP

(57) ABSTRACT

A method of operating a graphics processor that comprises a renderer that can render primitives to generate a render output using different shading rates is disclosed. A shading rate for rendering a primitive is determined based on a depth value for the primitive. This can reduce processing effort required to render a render output while maintaining an acceptable image quality.

18 Claims, 4 Drawing Sheets

GRAPHICS PROCESSING

BACKGROUND

The technology described herein relates to the processing of computer graphics, and in particular to a method of operating a graphics processor.

Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles.

The graphics primitives are usually generated by the applications program interface (API) for the graphics processing system, using the graphics drawing instructions (requests) received from the application (e.g. game) that requires the graphics processing (render) output.

Each primitive is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and a set of primitives that use those vertices.

Once primitives and their vertices have been generated and defined, they can be processed by the graphics processing system, in order to generate the desired graphics processing output (render output), such as a frame for display.

This basically involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output, e.g. scene to be displayed). This is typically done using the positions of the vertices of a primitive.

The rendering process then derives (samples) the data, such as red, green and blue (RGB) colour values and an "Alpha" (transparency) value, necessary to represent the primitive at the sample points (i.e. "shades" each sample point). This can involve, for example, applying textures, blending sample point data values, etc.

(The term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

Each fragment will typically have "fragment data", such as colour, depth and/or transparency data, associated with it, with the fragment data for a given fragment typically being derived from primitive data associated with (the vertices of) the primitive to which the fragment relates.

A "fragment" is therefore effectively (has associated with it) a set of primitive data as interpolated to a given output space sample point or points of a primitive. It may also include per-primitive and other state data that is required to shade the primitive at the sample point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing are carried out on the rendered image prior to displaying the final image.

It is also the case that as multiple fragments, e.g. from different overlapping primitives, at a given location may affect each other (e.g. due to transparency and/or blending), the final pixel output may depend upon plural or all fragments at that pixel location.

Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.

FIG. 1 shows a typical computer graphics processing system, comprising a host processor (CPU) 1, a graphics processing unit (GPU) 3, and a memory 5 for storing data required by and/or generated by the host processor 1 and graphics processor 3.

When an application 2 that is executing on the host processor 1 requires graphics processing from the graphics processor 3, such as a frame to be displayed, the application 2 will send appropriate commands and data to a driver 4 for the graphics processor 3 that is running on the host processor 1. The driver 4 will then send appropriate commands and data to the graphics processor 3 to cause it to generate the render output required by the application 2. The driver 4 sends commands and data to the graphics processor 3 by writing to the memory 5.

The commands and data provided by the driver 4 will include commands to render primitives for the render output to be generated by the graphics processor 3, together with associated vertex data representing the vertices to be used for the primitives for the render output.

The commands sent to the graphics processor 3 cause the graphics processor 3 to read the vertex data from the memory 5, and process the read vertex data to generate the render output. The graphics processor 3 will typically use the vertex data for a primitive to rasterise the primitive to one or more fragments each (potentially) applying to a region (area) of the render output. The fragments will then be rendered.

The completed render output (e.g. frame) may be written in a frame buffer in the memory 5, from where it may be provided for display on a display device, such as a screen or printer.

When rendering a render output, e.g. frame for display, there is typically a balance between image quality and processing effort. For example, "supersampling" arrangements attempt to increase image quality by increasing the number of colours that are sampled (rendered), but this typically involves a greater processing effort. Conversely, decreasing the number of colours that are sampled (rendered) will usually reduce processing requirements, but at the expense of reduced image quality.

"Variable rate shading" (VRS) is a technique that allows this balance between image quality and processing effort to be varied across a render output, e.g. frame for display. In particular, "variable rate shading" (VRS) allows the area of a render output, e.g. frame, that a single colour is sampled (rendered) for, i.e. the "shading rate", to vary within the render output.

Thus, in "variable rate shading" (VRS), different shading rates can be used to render a render output such that, for example, in some places in the output a single sampled (rendered) colour is used for a single output pixel, whereas elsewhere in the output, the same single sampled (rendered) colour is used for each of plural output pixels in a block of plural output pixels, thereby reducing the processing effort for those pixels.

The Applicants believe that there remains scope for improvements to graphics processors and to graphics processing.

BRIEF DESCRIPTION OF THE DRAWINGS

Various embodiments of the technology described herein will now be described by way of example only and with reference to the accompanying drawings, in which.

Like reference numerals are used for like components where appropriate in the drawings.

DETAILED DESCRIPTION

Figure 1:
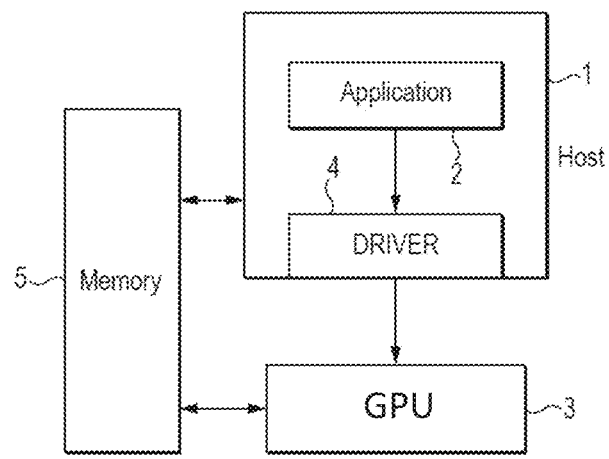
FIG. 1 shows an exemplary graphics processing system.

A first embodiment of the technology described herein comprises a method of operating a graphics processor comprising a renderer operable to render primitives to generate a render output using different shading rates; the method comprising:

when rendering a primitive, determining a shading rate for rendering the primitive based on a depth value for some or all of the primitive; and the renderer rendering some or all of the primitive using a shading rate based on the shading rate determined based on the depth value.

A second embodiment of the technology described herein comprises a graphics processor comprising a renderer circuit operable to render primitives to generate a render output using different shading rates; the graphics processor further comprising:

a shading rate determining circuit configured to determine a shading rate for rendering a primitive based on a depth value for some or all of the primitive;

wherein the renderer circuit is configured to render some or all of a primitive using a shading rate based on a shading rate determined based on a depth value for some or all of the primitive by the shading rate determining circuit.

The technology described herein is concerned with arrangements in which a render output can be rendered using one or more of plural different possible shading rates, such as in the case of "variable rate shading" (VRS). That is, the technology described herein is concerned with arrangements in which the area of the render output for which a single colour is rendered (sampled) by the renderer can be one of plural different possibilities.

For example, and in an embodiment, when a relatively fine shading rate is used, a single colour may be sampled by the renderer for an area of the render output corresponding to only a single pixel. When a coarser shading rate is used, however, a single colour may be sampled by the renderer for an area of the render output corresponding to a block of plural pixels.

In the technology described herein, (Z) depth is taken into account when determining a shading rate to use to render a primitive, such that the shading rate that is used to render the primitive is based (at least in part) on a (Z) depth value for the primitive. For example, and in an embodiment, a first shading rate is used to render a first primitive in a render output that has a first (Z) depth, and a second different shading rate is used to render a second primitive in the render output that has a second different (Z) depth.

The Applicants have recognised that it may be desirable to vary the balance between processing effort and image quality in a render output in dependence on depth. For example, it may often be the case that a lower rendering quality is acceptable, e.g. in term of overall perceived image quality, in regions of a render output that are further away from the camera (or plane of the render output), such that less processing effort can be spent on such regions, as compared to regions of the render output that are closer to the camera (or plane of the render output). Similarly, in the case of a "depth-of-field" method where a degree of blurring applied to a render output depends on depth, a lower rendering quality may have less of an impact on overall image quality in regions of the render output where a greater degree of blurring is applied, as compared to regions where there is less blurring.

The technology described herein facilitates this by determining shading rates based on (Z) depth values. This then means that for example, and in an embodiment, a finer shading rate may be used to render a primitive that is closer to the camera (or plane of the render output), and a coarser shading rate may be used to render a primitive is further away from the camera (or plane of the render output). Similarly, and in an embodiment, a finer shading rate may be used to render a primitive at a depth that will be subjected to a lower degree of "depth-of-field" blurring than a primitive at a depth that will be subjected to a greater degree of "depth-of-field" blurring.

This then means that the overall processing effort required to render a render output, e.g. frame for display, can be reduced, while maintaining an acceptable image quality.

It will be appreciated, therefore, that the technology described herein provides an improved graphics processor.

The graphics processor should, and in an embodiment does, generate a render output. Thus, the renderer (circuit) in an embodiment generates a render output by rendering one or more primitives. It will be appreciated that plural primitives may be, and in an embodiment are, rendered by the renderer in order to generate the render output. In this case, each primitive is in an embodiment rendered in the manner of the technology described herein.

The render output may comprise any suitable render output, such as frame for display, or render-to-texture output, etc. In an embodiment, the render output is an output frame in a sequence of plural output frames that the graphics processor generates. In this case, each output frame is in an embodiment generated in the manner of the technology described herein.

The render output will typically comprise an array of data elements (sampling points) (e.g. pixels), for each of which appropriate render output data (e.g. a set of colour value data) is generated. The data may comprise, for example, a set of red, green and blue, RGB values and a transparency (alpha, a) value.

The render output may be generated for display on a display device having a display or output comprising a plurality of pixels, such as a computer monitor or a printer. The render output may accordingly include, for each output pixel of the display device, a set of one or more corresponding data elements (sampling points). Each such set of data elements (sampling points) may include only a single data element (sampling point). Alternatively, each set of data elements may include plural data elements (sampling points). In this latter case, each sampling point may effectively correspond to a part of a pixel (e.g. a sub-pixel) of the display device, and the render output may be subjected to an appropriate downsampling operation to generate the output pixel values for displaying the final image on the display device.

The render output should be, and in an embodiment is, generated by the renderer (circuit) using one or more of plural possible different shading rates. Thus, there is in an embodiment a set of plural possible shading rates that the graphics processor supports and can use. Accordingly, determining a shading rate in an embodiment comprises (the shading rate determining circuit) selecting a shading rate from the set of plural possible shading rates.

Correspondingly, there should be, and in an embodiment is, a set of plural possible different sized render output areas for which a single set of colour value data (a single colour) can be sampled (rendered) by the renderer. Accordingly, the renderer (circuit) rendering some or all of a (the) primitive in an embodiment comprises the renderer sampling one or more sets of colour value data (colours) for the primitive, wherein the area of the render output for which each set of colour value data (colour) is sampled has a size in accordance with the shading rate used.

The smallest render output area in the set of plural possible render output areas may be referred to as a "fine pixel", and the other, larger render output areas may be referred to as "coarse pixels". Each "fine pixel" may be the same size and location as a pixel of the output display device. Alternatively, each "fine pixel" may correspond to less than one pixel of the output display device, for example where downsampling is to be applied.

The area of each possible "coarse pixel" in an embodiment corresponds to a block of plural "fine pixels".

The different possible shading rates may be referred to in terms of the number of fine pixels that the shading rate corresponds to. For example, a 1×1 shading rate may signify the finest possible shading mode in which a single set of colour value data is sampled for an area of the render output corresponding to a single fine pixel, whereas a 2×2 shading rate may signify that a single set of colour value data is sampled for an area of the render output corresponding to a block of 2×2 fine pixels.

The set of plural possible shading rates can include any suitable shading rates. In an embodiment, the set of plural possible shading rates includes 1×1, 1×2, 2×1, 2×2, 2×4, 4×2 and 4×4 shading rates. Other shading rates would be possible.

A depth value for some or all of a primitive should be, and in an embodiment is, a Z depth value, i.e. representing a distance into the scene being rendered at which the primitive is positioned, e.g. a distance from the plane of the render output (e.g. frame being generated) to the primitive, in the direction perpendicular to the plane of the render output, or a distance from the camera (viewpoint) to the primitive, in the view direction.

A (Z) depth value for some or all of a primitive may represent any suitable depth of the some or all of the primitive, such as a minimum, maximum or average (Z) depth of some or all of the primitive, or a (Z) depth of the primitive at a particular location, such as its centre (e.g. centroid) e.g. as projected onto the plane of the render output.

A (Z) depth value for a primitive may be for (representative of) all of the (the entire) primitive, or for (representative of) (only) some of the primitive. In an embodiment, a (Z) depth value is representative of (only) a region of a primitive. For example, and in an embodiment, a (Z) depth value for a primitive is the (Z) depth of a fragment generated from the primitive.

Thus, in an embodiment, the graphics processor comprises a rasteriser (circuit) configured to rasterise primitives to generate fragments; the renderer (circuit) is operable to render primitives by rendering fragments generated by the rasteriser; the rasteriser rasteriser the primitive to generate a fragment; and determining the shading rate is performed by (the shading rate determining circuit) determining the shading rate based on a depth value of the fragment. The renderer (circuit) may then render the fragment using a shading rate based on the shading rate determined based on the depth value of the fragment.

One or more, e.g. plural, fragments may be generated from the (same) primitive (by the rasteriser). In this case, a depth value of one or more, or each, fragment generated from the primitive is in an embodiment considered, and the fragment processed accordingly, in the manner of the technology described herein. Thus, it will be appreciated that the renderer (circuit) rendering all of a (the) primitive may comprise the renderer rendering (sampling a colour value for) each fragment generated from the primitive by the rasteriser (circuit). Correspondingly, the renderer rendering some of a (the) primitive may comprise the renderer rendering (sampling a colour value for) one or more (but not all) of the fragments generated from the primitive by the rasteriser.

The Applicants have recognised that it is possible that the Z depth of a primitive that is not parallel to the plane of the render output will vary for different sampling points (e.g. pixels) in a render output. By determining a depth value for a primitive as the (Z) depth value of one or more fragments generated from the primitive, any such depth variation may be accounted for in a straightforward manner. This then allows, for example and in an embodiment, a single (the) primitive to be rendered using plural different shading rates. For example, a first region of the primitive having a first depth may be rendered (as a first fragment) using a first shading rate, and a second region of the (same) primitive having a second different depth may be rendered (as a second different fragment) using a second different shading rate. This can then allow a reduction in the processing effort required to render that primitive.

The rasteriser (circuit) will generate graphics fragments for rendering to generate render output data for sampling points of the render output. Each fragment that is generated by the rasteriser should, and in an embodiment does, have associated with it a set of sampling points of the render output and may be used to generate render output data for one or more of the sampling points of the set of sampling points associated with the fragment.

The sets of sampling points that are associated with each fragment can be selected as desired. Each set of sampling points (and accordingly each sampling point) will represent a location (x, y position) in the render output, e.g., frame to be displayed. The pattern and (relative) positions of the sample points in each set of sampling points (the sampling pattern) can also be selected as desired.

Where the render output is to be displayed on a display device having a display or output comprising a plurality of pixels, each set of sampling points that a fragment may be associated with in an embodiment corresponds to a set of sampling points for a given pixel (pixel location) of the output device (e.g., display or printer), or to a set of sampling points for a part of a pixel (e.g. a sub-pixel) of the output device. In the latter arrangement, a group of plural of the sets of sampling points in an embodiment make up an overall set of sampling points for a pixel of the display. In these arrangements, each fragment may effectively render fragment data for a given pixel of the display device (e.g., display or printer).

A (Z) depth value of a fragment can represent any suitable and desired depth. For example, a (Z) depth value of a fragment may be representative of a (Z) depth at the centre of the fragment, e.g. the centre of all of the sampling points associated with the fragment. Alternatively, a (Z) depth value of a fragment may be representative of a (Z) depth at the centroid sample location, e.g. at the location of the sampling point that is closest to the centre of all of the covered sampling points associated with the fragment.

Alternately, a (Z) depth value of a fragment may be determined as a function of (Z) depths at each, in an embodiment covered, sampling point location associated with the fragment. For example, a minimum, average or maximum (Z) depth may be determined.

A (Z) depth value may be used solely for the purposes of determining a shading rate. However, in an embodiment, the (Z) depth value is (also) used for other purposes. For example, and in an embodiment, a (Z) depth value is used to perform a Z depth test, in addition to being used to determine a shading rate. Accordingly, the same (Z) depth value can be re-used. This can reduce the overall processing effort.

Thus, in an embodiment, the graphics processor comprises a depth testing circuit; and the depth testing circuit uses the same depth value to perform a depth test as the shading rate determining circuit uses to determine a shading rate. The (Z) depth value that is used may be determined by the depth testing circuit.

Fragments that do not pass the depth test should be, and in an embodiment are, discarded (culled), and so not rendered by the renderer, whereas fragments that do pass the depth test should, and in an embodiment do, pass to later stages of the graphics processing pipeline for processing.

Once a depth value has been determined, a shading rate can be determined based on the depth value in any suitable and desired manner.

In an embodiment, each of one or more possible depth values is associated with a respective shading rate, and a shading rate is then in an embodiment determined based on a depth value by (the shading rate determining circuit) determining the shading rate that the depth value is associated with.

Depth values and shading rates can be associated with each other in any suitable and desired manner. In an embodiment, an application that the render output is being generated for, and that is in an embodiment executed by a host processor, specifies a depth-based shading rate for each of one or more depth values.

Thus, a shading rate is in an embodiment determined based on a depth value by (the shading rate determining circuit of) the graphics processor determining the shading rate that has been specified for the depth value by an application that the render output is being generated for.

Depth-based shading rates specified by an application can be conveyed (from the host processor) to the graphics processor in any suitable and desired manner. In an embodiment, the application sends commands and/or data indicative of the specified shading rate(s) to a driver for the graphics processor that is executed on the host processor, in response to which the driver sends commands and/or data indicative of the specified shading rate(s) to the graphics processor.

Thus, the method in an embodiment comprises (and the graphics processor is correspondingly configured) the graphics processor receiving commands and/or data indicative of shading rate(s) specified by an application that the render output is being generated for, and (the shading rate determining circuit) determining the depth-based shading rate in accordance with the commands and/or data. The commands and/or data should thus, and in an embodiment do, indicate how the depth-based shading rate should vary according to depth.

The manner in which shading rate should vary according to depth may be indicated (by the commands and/or data) in any suitable and desired manner. For example, a function specifying how shading rate should vary according to depth may be provided (by the application).

In an embodiment, information indicating a shading rate for each of one or more depths or depth ranges is provided (by the application); and the depth-based shading rate is determined by (the shading rate determining circuit) determining the shading rate indicated by the information for the depth or depth range corresponding to the depth value.

This shading rate indicating information can take any suitable and desired form, but is in an embodiment in the form of an array which specifies how shading rate should vary according to depth, e.g. and in an embodiment a lookup table. The Applicants have found a lookup table to be a particularly efficient and convenient way to specify shading rates based on depth.

A shading rate indicating array (lookup table) should, and in an embodiment does, comprise an array of data elements, each specifying a shading rate for a particular depth or range of depths. A shading rate is then in an embodiment determined (by the shading rate determining circuit) as the shading rate specified in the array (lookup table) element corresponding to the (Z) depth value.

A shading rate indicating array (lookup table) could explicitly specify the depth or range of depths that each shading rate specified in the array applies to. However, in an embodiment, the depth or range of depths that each shading rate specified in the array applies to is implicit to the array (i.e. not explicitly specified in the array itself).

For example, and in an embodiment, each element in the shading rate indicating array (lookup table) specifies a shading rate for a particular, in an embodiment selected, in an embodiment predetermined depth or range of depths. Thus, a (the) shading rate indicating array (lookup table) is in an embodiment a one dimensional array, each element of which specifies a shading rate to use for a predetermined depth or range of depths. This can then reduce the amount of data required to specify the shading rate indicating array (lookup table), and facilitate efficient access to the shading rate indicating array (lookup table).

The (predetermined) depths or ranges of depths that correspond to elements of the shading rate indicating array (lookup table) can be selected as desired. In an embodiment, the range between a minimum depth and a maximum depth is divided into equal depth sub-ranges (i.e. that each span the same depth range). Each equal depth sub-range is then (implicitly) associated with a respective element of the shading rate indicating array (lookup table) based on the ordering of elements in the shading rate indicating array (lookup table). For example, the first element of the shading rate indicating array (lookup table) in an embodiment (implicitly) corresponds to the shallowest (or deepest) depth sub-range, and the last element of the shading rate indicating array (lookup table) in an embodiment (implicitly) corresponds to the deepest (or shallowest) depth sub-range, etc. In this case, the number of elements in the shading rate indicating array (lookup table) should accordingly be (exactly) equal to the number of depth sub-ranges.

The minimum and maximum depths can be any suitable depths. In an embodiment, the minimum and maximum depths correspond respectively to the minimum and maximum depths that a primitive can have and be rendered in the render output. That is, the minimum and maximum depths in an embodiment correspond to the depths of the near and far planes of the view frustum being used, respectively.

Thus, a (the) shading rate indicating array (lookup table) in an embodiment comprises an (one dimensional) array of ordered elements. Each element can accordingly be, and is in an embodiment, associated (implicitly) with a respective index value that can identify the respective element. For example, the shading rate indicating array (lookup table) in an embodiment comprises N elements, with the first element being referred to by index i=0, and the last element being referred to by index i=N−1. A shading rate is then in an embodiment determined by (the shading rate determining circuit) determining the index value for the shading rate indicating array (lookup table) element that corresponds to the (Z) depth value, and then retrieving the shading rate specified in the shading rate indicating array (lookup table) at that index value.

An index into a (the) shading rate indicating array (lookup table) can be determined in any suitable and desired manner. An index into a (the) shading rate indicating array (lookup table) is in an embodiment determined from the (Z) depth value. For example, and in an embodiment, an index value, i (=0, 1, . . . , N−1), into a lookup table having N entries is determined from a depth value Z by calculating $$i = \frac{Z - Z_{min}}{Z_{max} - Z_{min}} N,$$

and rounding down to the nearest integer, where $Z_{min}$ and $Z_{max}$ are the minimum and maximum depths respectively.

In an embodiment, (the shading rate determining circuit of the) the graphics processor comprises one or more functional units that are each operable to perform fused multiply-add (FMA) operations, and the index determining operation is optimised for execution by these "FMA units". The Applicants have recognised that, as will be discussed in more detail below, it is possible to carry out an index determining operation in a particularly efficient manner by a FMA unit carrying out a single fused multiply-add-scale operation.

Thus in an embodiment, the (the shading rate determining circuit of the) graphics processor comprises one or more functional units operable to perform fused multiply-add (FMA) operations; and one of the one or more functional units in an embodiment determines the index value from the depth value by performing a single fused multiply-add (FMA) operation. The single fused multiply-add (FMA) operation may be a fused multiply-add-scale operation, i.e. an operation which comprises scaling the result of a fused multiply-add (FMA) operation.

Moreover, and as will also be discussed in more detail below, the Applicants have recognised that the constants required for this operation can also be determined by an FMA unit. Thus, one of the one or more functional units in an embodiment determines one or more constants for use in the single fused multiply-add (FMA) operation.

Information indicating how shading rate should vary with depth (e.g. in the form of a (the) shading rate indicating array (lookup table)) could be accessed by (the shading rate determining circuit of) the graphics processor reading from an external memory, i.e. a memory that is not on the same chip as the graphics processor. However, the Applicants have recognised that this can result in increased latency and bandwidth requirements. In an embodiment, therefore, the information (shading rate indicating array (lookup table)) is stored locally to the graphics processor, i.e. in storage (memory) that is on the same physical chip as the graphics processor. The (shading rate determining circuit of the) graphics processor then accesses the locally stored information in order to determine a shading rate. This can then reduce latency and bandwidth requirements, for example.

Shading rate may vary according to depth in any suitable and desired manner. In general, a coarser shading rate may be specified for depths where it is known, or likely to be the case, that any resulting reduction in image quality will be less apparent and/or more acceptable to a user. Conversely, a finer shading rate may be specified for depths where it is known, or likely to be the case, that any resulting reduction in image quality will be more apparent and/or less acceptable to a user.

For example and in an embodiment, a finer shading rate may be specified for shallower depths (nearer to the camera/plane of the render output), and a coarser shading rate may be specified for deeper depths (farther from the camera/plane of the render output). Additionally or alternatively, a coarser shading rate may be specified for depths where a greater degree of distortion, e.g. blurring, is applied to the render output, and a finer shading rate may be specified for depths where a smaller degree of distortion, e.g. blurring, is applied to the render output.

Once a shading rate has been determined based on a depth value for (a fragment generate from) a primitive, then that shading rate may be used by the renderer (circuit) to render (the fragment generated from) the primitive irrespective of any other factors. Alternatively, there may be one or more other factors that are taken into account when determining the final shading rate that is used by the renderer (circuit). Thus, the shading rate that is used by the renderer (circuit) may be determined based on the depth value, and in an embodiment based on one or more other factors.

For example, and in an embodiment, a shading rate for rendering a primitive may be determined based on a depth value for some or all of the primitive and any one or more of: a drawcall that the primitive belongs to, a provoking vertex that the primitive is associated with, and a region of the render output within which the primitive falls within.

In an embodiment, a shading rate is determined for each such factor that is to be taken into account, and the shading rate that is actually used by the renderer is then determined based on each such determined shading rate. Thus, the shading rate used by the renderer is in an embodiment determined based on the shading rate determined based on the depth value and in an embodiment based on one or more shading rates each determined based on another factor.

In this case, it is possible that shading rates determined based on different factors will be different to each other. Shading rates determined based on different factors are thus in an embodiment combined into a single shading rate to be used by the renderer.

This combining can be done in any suitable manner. In an embodiment, shading rates are combined into a single shading rate using a combining function. The combining function may specify, for example, that shading rates determined based on different factors should be combined by using the finest or coarsest shading rate, or by determining and using an average shading rate.

In an embodiment, the factors that should be used to determine the shading rate, and/or a combining function to be used to combine any different shading rates are specified by the application that the render output is being generated for.

It will be appreciated, therefore, that the shading rate that is actually used by the renderer (circuit) to render (a fragment generated from) a primitive may be the same as or different to the shading rate determined based on the depth value (alone).

Once a shading rate to use has been determined, that shading rate is used by the renderer (circuit) when rendering (the fragment generated from) the primitive. This should, and in an embodiment does, have the effect that a greater number of colours are sampled by the renderer when a finer shading rate is determined, as compared to when a coarser shading rate is determined. This can be achieved in any suitable and desired manner.

For example, the rasteriser (circuit) could rasterise primitives into fragments based on shading rate, such that the area of the render output that a fragment generated by the rasteriser corresponds to varies according to shading rate. Thus, in an embodiment, the rasteriser (circuit) rasterises the primitive according to the shading rate used. For example, the rasteriser could generate fragments that correspond to larger areas of the render output when a coarser shading rate is used, and generate fragments that corresponds to smaller areas of the render output when a finer shading rate is used. The renderer may then sample a single set of colour value data (a single colour) for each so-generated fragment. This will then have the effect that a greater number of fragments are generated, and so colours are sampled, when a finer shading rate is used, as compared to when a coarser shading rate is used.

In an embodiment, the rasteriser (circuit) is operable to generate fragments in the "normal" manner. That is, in an embodiment, the rasteriser (always) operates to generate fragments that each correspond to the same sized area of the render output, e.g. corresponding to one pixel or sub-pixel (a "fine pixel") irrespective of the shading rate used. Fragments generated in this way are then in an embodiment "combined" according to the shading rate used into sets of one or more fragments, and a single set of colour value data (a single colour) is sampled for each such set of one or more fragments. For example, and in an embodiment, a greater number of fragments are included in a set of fragments when a coarser shading rate is used, as compared to when a finer shading rate is used. This will then have the effect that a greater number of colours are sampled when a finer shading rate is used, as compared to when a coarser shading rate is used.

This "combining" of fragments can be achieved in any suitable and desired manner.

In an embodiment, the renderer (circuit) comprises a programmable processing stage (circuit) (shader) that is operable to generate render output data by execution threads executing (shader) program instructions. In an embodiment, a single set of colour value data is generated (a single colour is sampled) by each execution thread executing the (shader) program. In this case, fragments are, in effect, "combined" by in an embodiment issuing (only) one execution thread to the programmable processing stage (shader) for each set of one or more fragments. This then has the effect that the programmable processing stage (shader) executes the (shader) program (only) once for each set of one or more fragments, such that (only) a single set of colour value data is sampled for each set of "combined" fragments.

In an embodiment, execution threads are grouped into "groups" or "bundles" of threads, where the threads of one group are run in lockstep, one instruction at a time. This can improve shader program execution efficiency, because it is possible to share instruction fetch and scheduling resources between all the threads in the group. Other terms used for such thread groups include "warps" and "wave fronts". For convenience, the term "thread group" will be used herein, but this is intended to encompass all equivalent terms and arrangements, unless otherwise indicated.

In this case, in an embodiment, the "combining" of fragments occurs when determining thread groups to be executed by the programmable processing stage (shader). Thus, in an embodiment, the renderer (circuit) comprises a thread group generating stage (circuit) operable to generate thread groups comprising execution threads for execution by the programmable processing stage (circuit) (shader).

In this case, in an embodiment, the renderer (circuit) rendering the primitive comprises the thread group generating stage (circuit) generating a thread group comprising execution threads for execution by the programmable processing stage (shader) based on the shading rate used (and the programmable processing stage (circuit) (shader) executing the execution threads in the thread group).

Once a colour (set of colour value data) has been sampled by the renderer (executing the (shader) program), the colour should be, and in an embodiment is, "broadcast" to each (e.g. covered) sampling position in the render output that the colour applies to. This should, and in an embodiment does, have the effect that a single colour will be used for more sampling positions in the render output when a coarser shading rate is used, as compared to when a finer shading rate is used.

In an embodiment, render output data is "broadcast" to each corresponding sampling position in an output buffer, e.g. tile buffer. This may comprise writing render output data produced by the renderer (directly) to the output buffer based on the shading rate used. Alternatively, where blending is required, a blender stage of the graphics processing pipeline may appropriately blend render output data newly generated by the renderer with render output data already stored in the output buffer based on the shading rate used.

The graphics processor may execute any suitable and desired graphics processing pipeline, and may and in an embodiment does, include any suitable and desired processing circuits, processing logic, components and elements for that purpose.

The graphics processor and graphics processing pipeline may be, and in an embodiment are, a tile-based graphics processor and processing pipeline operable to generate tiles of an overall render output, e.g. frame.

The graphics processing pipeline that the graphics processor executes can include any suitable and desired processing stages for generating a (the) render output (e.g. frame). Thus, the graphics processing pipeline can include, and in an embodiment does include, in addition to the above described stages (such as the rasteriser, renderer, and depth tester), any one or one or more, and in an embodiment all, of the other processing stages that graphics processing pipelines normally include. Thus, for example, the graphics processing pipeline in an embodiment also includes a vertex shading stage, a primitive setup stage, etc. Where the pipeline is a tile-based pipeline, the pipeline in an embodiment also comprises a tiling stage, and/or a write out unit that operates to write the data in the tile buffer (e.g. once the data in the tile buffer is complete) out to external (main) memory (e.g. to a frame buffer).

A (and each) processing stage (circuit) of the graphics processing pipeline (processor) can be implemented as desired, e.g. as a fixed function hardware unit (circuit) or as a programmable processing circuit (that is programmed to perform the desired operation).

As will be appreciated by those skilled in the art, the graphics processor of the technology described herein may be part of an overall graphics processing system that includes, e.g., and in an embodiment, a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in an embodiment does, also execute a driver for the graphics processor and a compiler or compilers for compiling programs to be executed by the (programmable processing stage (shader) of the) graphics processor.

The graphics processor may also comprise, and/or be in communication with, one or more memories and/or memory devices that store the data described herein, and/or the output data generated by the graphics processor, and/or store software (e.g. (shader) program) for performing the processes described herein. The graphics processor may also be in communication with a host microprocessor, and/or with a display for displaying images based on the data generated by the graphics processor.

The technology described herein can be used for all forms of output that a data processor (and processing pipeline) may be used to generate. For example, in the case of graphics processing, the graphics processing pipeline may generate frames for display, render-to-texture outputs, etc. The output data values from the processing are in an embodiment exported to external, e.g. main, memory, for storage and use, such as to a frame buffer for a display.

The technology described herein is applicable to any suitable form or configuration of graphics processor and graphics processing system. It is particularly applicable to tile-based graphics processors and graphics processing systems. Thus in an embodiment, the graphics processor is a tile-based graphics processor (and pipeline).

In an embodiment, the various functions of the technology described herein are carried out on a single graphics processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or micro-processor based system.

The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

An embodiment of the technology described herein will now be described with reference to the Figures.

When a computer graphics image is to be displayed, it is usually first defined as a series of primitives (polygons), which primitives are then divided (rasterised) into graphics fragments for graphics rendering in turn. These fragments are the processing entities that pass through the rendering process (the rendering pipeline). During a normal graphics rendering operation, the renderer typically samples a single colour (e.g. a set of red, green and blue, RGB values and a transparency (alpha, a) value) for each fragment so that the fragments can be displayed correctly. Once the fragments have fully traversed the renderer, then their associated colour values are stored in memory, ready for output, e.g. for display on a display device.

Each graphics fragment will typically be the same size and location as a "pixel" of the output display device. Alternatively, each graphics fragment may effectively correspond to less than one pixel of the output display device, for example where downsampling is to be applied.

Thus, the rendering process may typically produce a render output comprising an array of sampling points, for each of which appropriate data (e.g. a set of colour value data) is generated. For each output pixel, there is typically a set of one or more corresponding sampling points in the render output. Each such set of sampling points may include only one sampling point, or where downsampling is used, each set of sampling points may include plural sampling points.

As discussed above, "variable rate shading" (VRS) is a technique that allows different shading rates to be used to render a render output, i.e. such that a single colour (set of colour value data) can be sampled (rendered) for one of plural possible different sized areas in a render output. For example, a single colour may be sampled for an area of the render output corresponding to only a single pixel, or a single colour may be sampled for an area of the render output corresponding to each pixel in a block of plural pixels.

Sampling (rendering) a single colour and applying it to plural sampling points (e.g. pixels) will reduce the processing effort required for those sampling points, as compared to sampling an individual colour for each sampling point, but will usually come at the expense of reduced image quality.

In "variable rate shading" (VRS), there will typically be a set of plural possible shading rates that a graphics processor supports and is able to use. That is, there will typically be a set of plural possible different sized render output areas that a single colour (set of colour value data) can be sampled for. The smallest possible of these render output areas may be referred to as a "fine pixel", and the other, larger render output areas may be referred to as "coarse pixels".

Each "fine pixel" will typically be the same size and location as a pixel of the output display device. However, it is also possible for each "fine pixel" to effectively correspond to less than one pixel of the output display device, for example where downsampling is to be applied.

The area of each possible "coarse pixel" typically corresponds to a block of plural "fine pixels". The different possible shading rates are then referred to in terms of the number of fine pixels that the shading rate corresponds to. For example, a 1×1 shading rate will signify the finest possible shading mode in which a single colour should be sampled for a single fine pixel, whereas a 2×2 shading rate will signify that a single colour should be sampled for an area corresponding to a block of 2×2 fine pixels. A graphics processor may typically support 1×1, 1×2, 2×1, 2×2, 2×4, 4×2 and 4×4 shading rates, for example.

Figure 2:
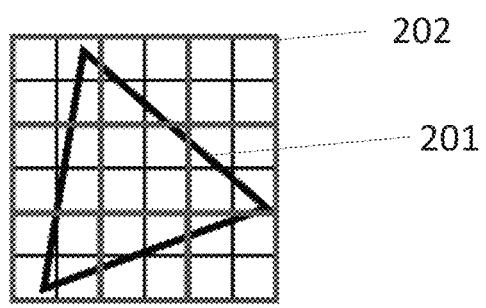
FIG. 2 illustrates an exemplary primitive being rendered according to different shading rates.

FIG. 2 illustrates a comparison of an exemplary primitive 201 being rendered using 1×1 and 2×2 shading rates. FIG. 2 shows the location of the exemplary primitive 201 to be rendered relative to a 6×6 block of fine pixels 202. Each small square represents one of the fine pixels of the "variable rate shading" (VRS) process.

In the case of a 1×1 shading rate, the rendering process samples (renders) a single colour (set of colour value data) for each fine pixel that a primitive covers. In this case, the primitive 201 is visible in (covers) 23 out of the 36 illustrated fine pixels, and so the rendering process will sample a total of 23 colours (sets of colour value data).

Each larger square in FIG. 2 represents one 2×2 coarse pixel that is used in the 2×2 shading rate process. Each 2×2 coarse pixel encompasses a block of 2×2 fine pixels. In this case, the rendering process samples (renders) a single colour (set of colour value data) for each such coarse pixel that a primitive covers. In this case, the primitive 201 covers 8 out of the 9 illustrated 2×2 coarse pixels, and so the rendering process will sample only 8 colours (sets of colour values).

Thus, it will be appreciated that a coarser shading rate is associated with a lower density of rendered colours as compared to a finer shading rate. Moreover, it will be appreciated that rendering the primitive 201 using a coarser shading rate will reduce processing requirements, as compared to rendering the primitive 201 using a finer shading rate. However, this will typically come at the expense of reduced image quality.

As discussed above, the Applicants have recognised that it may be desirable to vary shading rate (i.e. the size of the area of the render output for which a single colour is sampled) in dependence on the depth of objects appearing in a render output.

For example, it may often be the case that a lower rendering quality is acceptable, e.g. in term of overall perceived image quality, in regions of a render output that are further away from the camera (or plane of the render output), such that less processing effort can be spent on such regions, as compared to regions of the render output that are closer to the camera (or plane of the render output). Similarly, in the case of a "depth-of-field" method, where a degree of blurring applied to a render output depends on depth, a lower rendering quality may be more acceptable in regions of the render output where a greater degree of blurring is applied, as compared to regions where there is less blurring.

Figure 3:
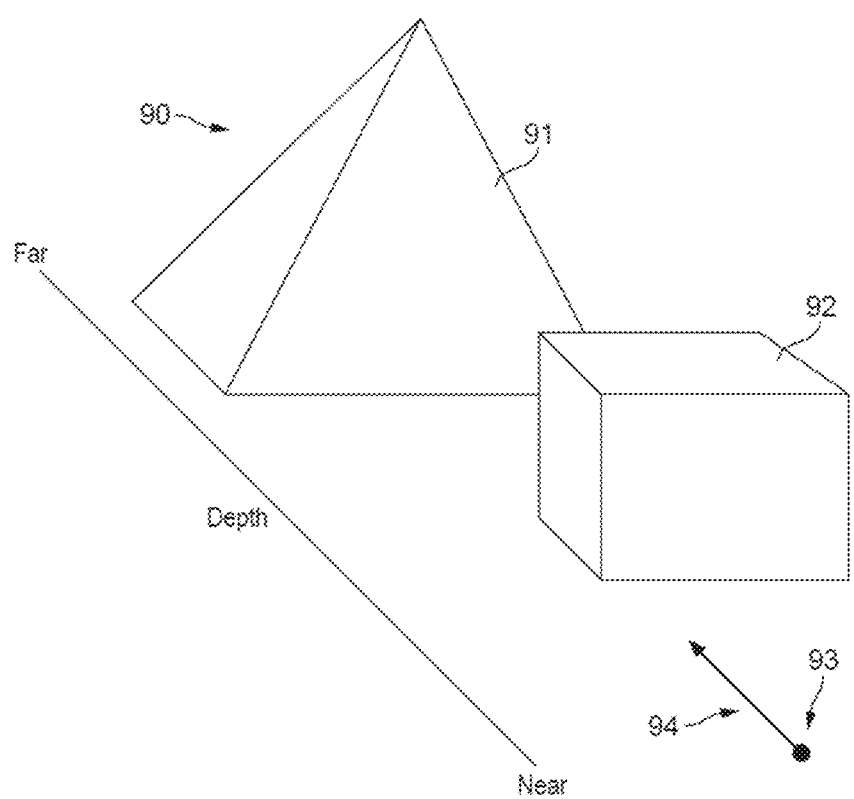
FIG. 3 shows an exemplary scene with different objects having different (Z) depths.

For example, FIG. 3 shows an example scene 90 comprising two objects, pyramid 91 and cube 92, that is viewed by a camera from viewpoint 93 in view (Z) direction 94. In this view of the scene 90, cube 92 lies at a shallower depth (i.e. nearer to the camera) than pyramid 91. It may therefore typically be more acceptable to use a lower rendering quality for pyramid 91 than for cube 92.

In the technology described herein, (Z) depth is taken into account when determining a shading rate to use to render a primitive or fragment. For example, a finer shading rate may be used to render a primitive that is closer to the camera (or plane of the render output), and a coarser shading rate may be used to render a primitive is further away from the camera (or plane of the render output). This can then result in a reduction in processing effort for regions of the render output where the consequent reduction in rendering quality may be less apparent and/or more acceptable.

Thus, for example, different shading rates may be used to render primitives of different objects that have different depths. For instance, in the example of FIG. 3, primitives of cube 92 may be rendered using a finer shading rate than primitives of pyramid 91. Moreover, different shading rates may be used to render different primitives of the same object that have different depths. For instance, in the example of FIG. 3, a finer shading rate may be used to render primitives of cube 92 that are closer to the camera than primitives of cube 92 that are further away. Moreover, different shading rates may be used to render different regions of the same primitive that have different depths. For instance, in the example of FIG. 3, the front face of pyramid 91 may be a single primitive that is rasterised into multiple fragments having different depths, and a finer shading rate may be used to render a fragment (or fragments) that is closer to the camera than a fragment (or fragments) that is further away.

This then means that the overall processing effort required to render a render output, e.g. frame for display, can be reduced, while maintaining an acceptable image quality.

FIG. 1 shows a graphics processing system which may be operated in accordance with an embodiment of the technology described herein. The graphics processing system comprises a host processor (CPU) 1, a graphics processing unit (GPU) 3, and a memory 5 for storing data required by and/or generated by the host processor 1 and graphics processor 3.

When an application 2 that is executing on the host processor 1 requires graphics processing from the graphics processor 3, such as a frame to be displayed, the application 2 sends appropriate commands and data to a driver 4 for the graphics processor 3 that is running on the host processor 1.

In the present embodiment, these commands and data include information indicating shading rates that should be used by the graphics processor 3 when generating a render output. In the present embodiment, as well as specifying shading rate according to the depth of a primitive, the application 2 is also able to specify shading rate based on the drawcall that the primitive belongs to, and/or a provoking vertex that the primitive is associated with, and/or the region of the render output within which the primitive appears. Thus, as well as specifying "per-depth" shading rates, the application 2 may also specify "per-drawcall" shading rates, and/or "per-primitive" shading rates, and/or "per-screen space" shading rates.

In the case that the application 2 specifies shading rates based on two or more different criteria, then it may be the case that the different criteria return different shading rates for the same primitive (fragment). The application 2 may therefore also specify how different shading rates should be combined. To do this, the application 2 specifies a set of combiner functions that should be used to combine different shading rates. For example, the application 2 may specify that different shading rates should be combined by using the finest or coarsest shading rate, or by determining an average shading rate.

In response to these commands and data from the application 2, the driver 4 then sends appropriate commands and data to the graphics processor 3 to cause it to generate the render output required by the application 2. The driver 4 sends commands and data to the graphics processor 3 by writing to the memory 5.

The commands and data provided by the driver 4 will include commands to render primitives for the render output to be generated by the graphics processor 3, together with associated vertex data representing the vertices to be used for the primitives for the render output. They will also include information indicating the shading rates specified by the application 2.

The commands sent to the graphics processor 3 cause the graphics processor 3 to read the vertex data from the memory 5, and process the read vertex data to generate the render output accordingly. The graphics processor 3 will typically use the vertex data for a primitive to rasterise the primitive to one or more fragments each (potentially) applying to a region (area) of the render output. The fragments may then be rendered.

The completed render output (e.g. frame) may be written in a frame buffer in the memory 5, from where it may be provided for display on a display device, such as a screen or printer.

Figure 4:
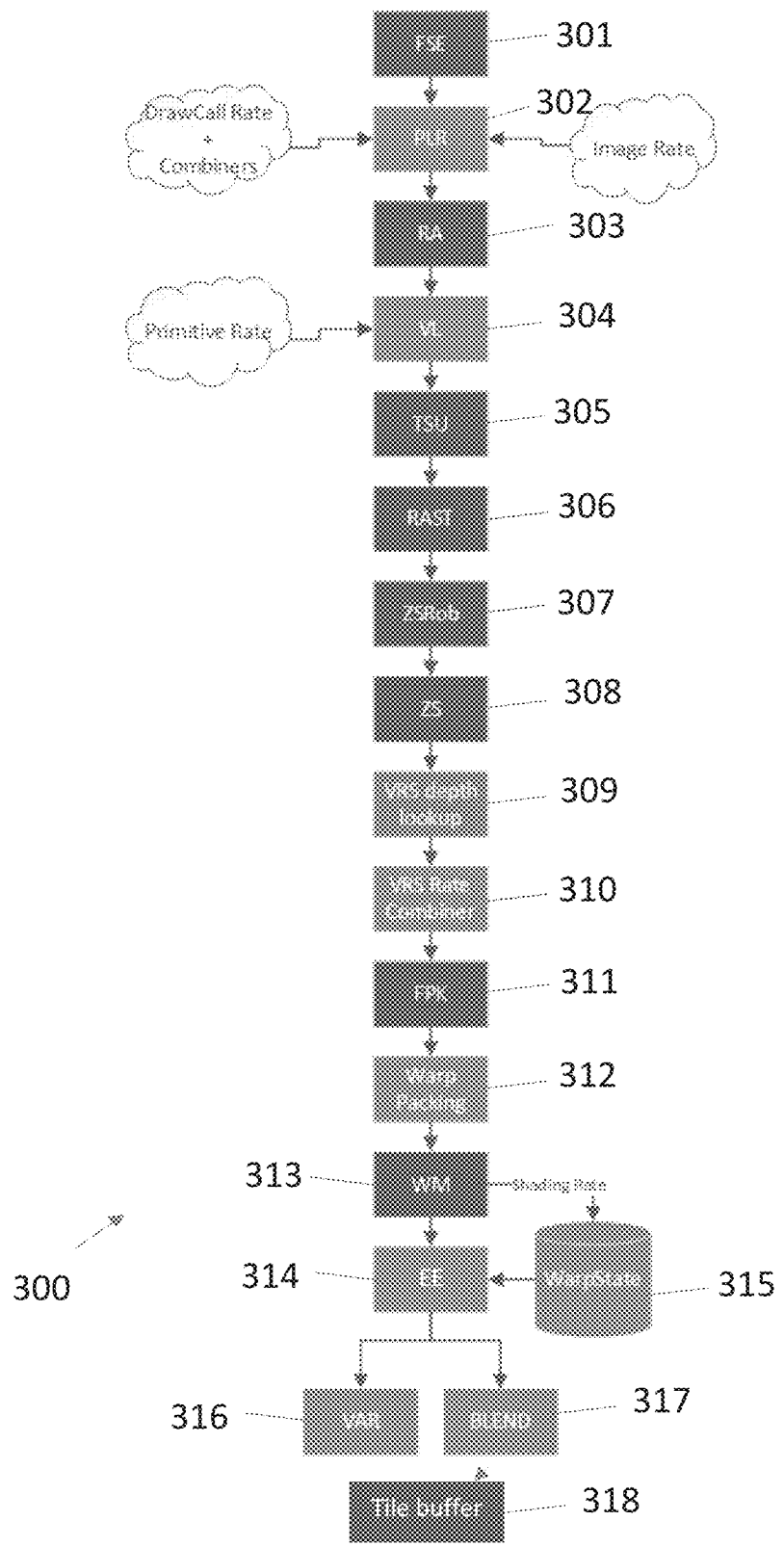
FIG. 4 shows a graphics processing pipeline which may be operated in accordance with an embodiment of the technology described herein.

FIG. 4 shows a graphics processing pipeline 300 that may be executed by the graphics processor 3 in accordance with an embodiment. FIG. 4 shows the main elements and pipeline stages of the graphics processing pipeline 300 that are relevant to the operation of the present embodiment. As will be appreciated by those skilled in the art there may be other elements of the graphics processing pipeline that are not illustrated in FIG. 4. It should also be noted here that FIG. 4 is only schematic, and that, for example, in practice the shown functional units and pipeline stages may share significant hardware circuits, even though they are shown schematically as separate stages in FIG. 4. It will also be appreciated that each of the stages, elements and units, etc., of the graphics processing pipeline as shown in FIG. 4 may be implemented as desired and will accordingly comprise, e.g., appropriate circuit(s) and/or processing logic, etc., for performing the necessary operation and functions.

The graphics processing pipeline 300 shown in FIG. 4 is a tile-based renderer and will thus produce tiles of a render output data array, such as an output frame to be generated.

The render output data array may typically be an output frame intended for display on a display device, such as a screen or printer, but may also, for example, comprise intermediate data intended for use in later rendering passes (also known as a "render to texture" output), etc.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The advantage of such tile-based rendering is that graphics processing commands (primitives) that do not apply to a given tile do not have to be processed for that tile, and therefore can be ignored when the tile is processed. This allows the overall amount of graphics processing necessary for a given render output to be reduced.

In a tile-based rendering system, it is accordingly usually desirable to be able to identify and know those commands (primitives) that actually apply to a given rendering tile so as to, e.g., avoid unnecessarily processing commands and primitives that do not actually apply to a tile.

In order to facilitate this, in the present embodiment, lists of the primitives to be processed are prepared for different regions of the render output. These "primitive lists" (which can also be referred to as a "tile list" or "polygon list") identify (e.g. by reference to a primitive indicator) the primitives to be processed for the region in question. The regions of the render output that primitive lists can be prepared for can correspond e.g. to single rendering tiles, or to sets of plural rendering tiles. Once the primitive lists have been prepared for the render output regions, each rendering tile can then be processed by rasterising and rendering the primitives listed for the region(s) that encompass the rendering tile.

Any suitable and desired vertex shading operations may also be performed on the vertex data for the primitives. The vertex shading operations may operate to transform attributes for each vertex into a desired form for the subsequent graphics processing operations. This may comprise, for example, transforming vertex position attributes from the world or user space that they are initially defined for to the screen space that the output of the graphics processing system is to be displayed in. The primitive lists and processed vertex data may then be stored in the memory 5.

FIG. 4 shows the stages of the graphics processing pipeline 300 following the generation and storing of primitive lists and processed (vertex-shaded) vertex data. These stages operate to generate each tile of the render output in turn using the primitive lists and processed vertex data stored in the memory 5. Tiles generated in this manner are then combined to generate the entire render output.

As shown in FIG. 4, the graphics processing pipeline 300 includes a fragment shading endpoint ("FSE") 301, which schedules the rendering work that the graphics processing pipeline 300 needs to perform in order to generate a tile.

In response to the fragment shading endpoint ("FSE") 301 scheduling rendering work for a tile, a primitive list reader ("PLR") 302 reads the appropriate primitive list(s) for that tile from the memory 5 to identify the primitives that are to be rendered for the tile.

As shown in FIG. 4, the primitive list reader ("PLR") 302 also reads in the "per-drawcall" shading rate, "per-screen space" shading rate, and combiner function information from the memory 5.

A resource allocator ("RA") 303 then configures the various elements of the GPU 3 for rendering the primitives that the primitive list reader ("PLR") 302 has identified are to be rendered for the tile. For example, the resource allocator ("RA") 303 appropriately configures the tile buffer 318 for storing output data for the tile being rendered.

The tile buffer 318 is provided as part of RAM that is located on (local to) the graphics processing pipeline (chip). The tile buffer 318 stores colour and depth buffers that store an appropriate colour, etc., or Z-value, respectively, for each sampling point that the buffers represent (in essence for each sampling point of a tile that is being processed). These buffers store an array of data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

A vertex loader ("VL") 304 then reads the appropriate processed vertex data for primitives to be rendered from the memory 5, and provides the primitives (i.e. their processed vertex data) to a triangle set-up unit ("TSU") 305.

As shown in FIG. 4, the vertex loader ("VL") 304 also reads in the "per-primitive" shading rate information from the memory 5.

The triangle set-up unit ("TSU") 305 performs primitive setup operations to setup the primitives to be rendered. This includes determining, from the vertices for the primitives, edge information representing the primitive edges. The edge information for the primitives is then passed to the rasteriser 306.

When the rasteriser 306 receives a graphics primitive for rendering (i.e. including its edge information), it rasterises the primitive to sampling points and generates one or more graphics fragments having appropriate positions (representing appropriate sampling positions) for rendering the primitive.

Fragments generated by the rasteriser 306 then pass to the Z depth and stencil test re-order buffer ("ZSRob") 307. The Z depth and stencil test re-order buffer ("ZSRob") 307 may operate to re-order fragments into an order that is suitable for subsequent processing by the Z depth and stencil test stage ("ZS") 308.

The Z depth and stencil test stage ("ZS") 308 performs a Z depth test on fragments it receives from the Z depth and stencil test re-order buffer ("ZSRob") 307, to see if any fragments can be discarded (culled) at this stage. To do this, it determines a Z depth value of a fragment, and compares the determined Z depth value with a corresponding Z depth value stored in the Z depth buffer to determine whether the fragment will be occluded by previously rendered data (or not). If it is determined that the fragment will be occluded (for example, if it is determined that the depth value of the fragment is greater than the corresponding depth value in the depth buffer), the fragment does not pass the Z depth test and is discarded. At the same time, an early stencil test may also be carried out. Fragments that pass the Z depth and stencil test stage ("ZS") 308 are then sent onwards to the rest of the pipeline for processing.

The Z depth value of the fragment may be determined at the centre of the fragment, or at the centroid sample location. Alternatively, the depth may be determined using a function of the Z depths determined at all covered sampling points, such as a minimum or maximum function.

There is then a depth shading rate lookup stage 309, which operates to determine a "per-depth" shading rate that should be used to render a fragment based on the Z depth of the fragment provided by the Z depth and stencil test stage ("ZS") 308. This operation will be discussed in more detail below.

The shading rate combiner stage 310 may then combine the "per-depth" shading rate determined by the depth shading rate lookup stage 309 with "per-drawcall", and/or "per-primitive", and/or "per-screen space" shading rates using the combiner function information read from the memory 5. This process results in an overall combined shading rate to be used for the fragment in question.

Fragments may then be subject to further culling operations, such as a "forward pixel kill" test by forward pixel kill stage ("FPK") 311, e.g. as described in United States Patent Application Publication No. 2019/0088009 (Arm Limited).

Fragments surviving the forward pixel kill stage ("FPK") 311 then pass to warp packing stage 312. The warp packing stage 312 operates in conjunction with warp manager ("WM") 313 to issue appropriate groups of execution threads ("warps") to execution engine ("EE") 314 for execution.

In the present embodiment, the execution engine 314 executes a shader program for each execution thread issued to it to generate appropriate render output data, including colour (red, green and blue, RGB) and transparency (alpha, a) data. The shader program is provided by the application 2 and may be complied for execution by the driver 4.

The threads in one group of execution threads ("warp") each execute the shader program in lockstep, one instruction at a time. Grouping execution thread into groups in this manner can improve the execution efficiency of the execution engine 314, because it is possible to share instruction fetch and scheduling resources between all the threads in the group.

In the present embodiment, the warp packing stage 312 generates thread groups ("warps") that each comprise a total of sixteen execution threads. Other groupings of threads would of course be possible.

Typically, each thread in a thread group ("warp") will correspond to, and calculate render output data for, a fixed set of one or more sampling points in the render output. However, in the present embodiment, the number of sampling points (e.g. pixels) that a thread corresponds to depends on the shading rate that is used. To facilitate this, the warp packing stage 312 operates to generate thread groups ("warps") based on the shading rate determined by the shading rate combiner stage 310.

For example, when a 1×1 shading rate is indicated by the shading rate combiner stage 310, the warp packing stage 312 generates a thread group ("warp") that includes one or more threads which will each execute the shader program to generate render output data for one or more sampling points in the render output corresponding to a respective single fine pixel. When a 1×2 shading rate is used, however, the warp packing stage 312 generates a thread group ("warp") that includes one or more threads that will each execute the shader program to generate render output data for one or more sampling points in the render output corresponding to a respective 1×2 coarse pixel. Other shading rates will be handled in a corresponding manner.

Thus, the execution engine 314 can execute execution threads that represent fine pixels and, where a coarser shading rate is being used, execution threads that represent coarse pixels.

Thread groups ("warps") generated by the warp packing stage 312 then pass to the warp manager 313, which issues threads appropriately to the execution engine ("EE") 314 for execution. The warp manager 313 also stores in warp state storage 315 (in memory 5) information indicating the shading rates associated with thread groups ("warps") issued thread to the execution engine 314.

The execution engine ("EE") 314 then executes the execution threads within thread groups ("warps") appropriately so as to perform the appropriate shading operations and generate the appropriate render output data for each execution thread, i.e. including colour (red, green and blue, RGB) and transparency (alpha, a) data.

As shown in FIG. 4, a varying interpolation stage ("VAR") 316 of the pipeline 300 is responsible for performing interpolation tasks for the execution engine ("EE") 314. The varying interpolation stage ("VAR") 316 interpolates per-vertex attributes (such as per-vertex colours, texture coordinates, etc.), for example from the vertices of a primitive to the current sampling point location.

When performing variable rate shading, the varying interpolation stage's 316 interpolation can depend on the shading rate, for example where each coarse or fine pixel is to be sampled at its geometrical centre (since, for example, the geometrical centre of a 2×2 coarse pixel is not the same as a 1×1 fine pixel or a 2×1 coarse pixel). The varying interpolation stage ("VAR") 316 can therefore receive shading rate information from the warp state storage 315. Interpolation results from the varying interpolation stage ("VAR") 316 may be returned to the execution engine ("EE") 314, e.g. for use for further processing.

Output data generated by the execution engine ("EE") 314 is then written appropriately to the tile buffer 318. If blending is required, any necessary blending operations with data already stored in the tile buffer 318 is performed by blender stage ("BLEND") 317, and the blended data is then written to the tile buffer 318. Alternatively, where blending is not required, the blender stage ("BLEND") 317 may write output data directly to the tile buffer 318.

The shading rate information stored in the warp state storage 315 is read and used to control this writing out of data by the blender stage 317. For example, in the case of a 1×1 shading rate, a single set of output data values will be written to one or more sampling points in the tile buffer 318 corresponding to a (only) single fine pixel. In the case of a coarser shading rate, a single set of output data values will be written to one or more sampling points in the tile buffer 318 corresponding to a block of plural fine pixels. For example, in the case of a 1×2 shading rate, a single set of output data values will be written to one or more sampling points in the tile buffer 318 corresponding to a block of 1×2 fine pixels. Other shading rates will be handled in a corresponding manner.

Thus, the (blended) output data (values) are written to the tile buffer 318 from where they can, for example, be output to a frame buffer for display. Output Z depth values are also written appropriately to a Z-buffer within the tile buffer 318.

The execution engine ("EE") 314 may include a message block which may be used by the execution engine ("EE") 314 to communicate with one or more slave units (such as for example the varying interpolation stage ("VAR") 316, a texture unit, and the blender ("BLEND") 317) by sending message(s). When, for example, the execution engine ("EE") 314 executes a varying interpolation instruction in its shader program, the execution engine ("EE") 314 can instruct the message block to create a message which is sent to the varying interpolation stage ("VAR") 316. When performing variable rate shading, the message block will read the shading rate from the warp state storage 315, which is prepared by the warp manager 313 when the warp (thread group) is spawned. The shading rate is then supplied to the varying interpolation stage ("VAR") 316 and/or the blender 317 as appropriate.

Where downsampling is being used, the output of data from the tile buffer 318 may comprise tile buffer data being input to a downsampling (multisample resolve) write out unit (not shown), and thence output (written back) to an external memory output buffer, such as a frame buffer of a display device in memory 5. The display device could comprise, e.g., a display comprising an array of pixels, such as a computer monitor or a printer. In this case, the downsampling and writeout unit downsamples the data stored in the tile buffer 318 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory 5 (e.g. to a frame buffer in a main memory 5) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 300 would, of course, be possible.

In the present embodiment, as part of the application 2 providing commands and data to the driver 4, the application 2 indicates that a depth-based shading rate should be used, and provides information in the form of a lookup table that indicates the particular shading rate(s) that should be used. The lookup table indicates, for each of plural Z depth ranges, a respective shading rate that should be used for fragments having a Z depth within the respective Z depth range.

The driver 4 then sends appropriate commands and data to the graphics processor 3, including writing information indicative of the lookup table to the memory 5.

At the beginning of a render pass, the graphics processor 3 then operates to read the lookup table information from the memory 5, and store corresponding information in storage, e.g. a memory, that is local to (i.e. on the same chip as) the graphics processor 3. During the render pass, the graphics processor 3 then accesses lookup table information from its local storage as appropriate.

Thus, the graphics processor 3 reads lookup table information from external memory 5 only once, and the depth shading rate lookup stage 309 can then access that information plural times from the local storage during a render pass. Storing and accessing lookup table information locally in this manner can reduce latency and bandwidth requirements, and reduce or avoid data reading misses, as compared to always accessing lookup table information from the external memory 5. To facilitate this local storage, the number of entries in (i.e. size of) the lookup table may be limited to a small power of two, such as four, eight or sixteen.

In the present embodiment, only a single lookup table is specified by the application 2 per render pass. However, in other embodiments, plural lookup tables are specified for a render pass, for example one for each of plural viewports. In this case, a "per-depth" shading rate for a fragment will be determined using the lookup table for the viewport that the fragment is associated with.

In the present embodiment, the lookup table specifies the shading rate(s) that should be used for Z depths that fall within a range from $Z_{near}$ to $Z_{far}$. The minimum and maximum depths, $Z_{near}$ and $Z_{far}$, may correspond respectively to the depths of the near and far planes of the view frustum being rendered, for example.

A 1×1 shading rate may be defaulted to, e.g. in the case that a shading rate for a depth outside of the range of the depth table is requested, or in the case that an "Inf" or "NaN" result is returned.

The range $Z_{near}$ to $Z_{far}$ is divided into equal sub-ranges, and a shading rate is specified in the lookup table for each such sub-range. Splitting the depth range into equal sub-ranges avoids the need for the minima and maxima of depth sub-ranges to be explicitly specified, thereby reducing the amount of data required to specify the lookup table.

Moreover, this arrangement can facilitate particularly fast and efficient access to the lookup table. In particular, in this case, an index, i (=0, 1, . . . , N−1), into the lookup table having N entries can be determined for a depth Z by calculating:

$$i = \frac{Z - Z_{near}}{Z_{far} - Z_{near}} N, \quad (1)$$

and then rounding down to the nearest integer. Equation (1) can be rearranged into the form:

$$i = (AZ - B)N, \quad (2)$$

where $A = 1/(Z_{far} - Z_{near})$ and $B = Z_{near}/(Z_{far} - Z_{near})$.

The Applicants have recognised that the index determining operation according to equation (2) is essentially equivalent to an operation for converting from a floating point representation of a number to an unsigned integer representation of the number, and as such may be calculated in a particularly efficient manner. In particular, this operation may be calculated efficiently in hardware by a FMA (fused multiply-add) unit.

For example, the following pseudo codes illustrates how the index is determined according to the present embodiment.

| | |
|---|---|
| F32 depth; | // depth of coarse pixel |
| F32 Znear; | // depth of near plane |
| F32 Zfar; | // depth of far plane |
| U32 size; | // Log2 of size of depth table |
| F32 range = Zfar − Znear; | // depth range of depth table |
| F32 A = recip(range) | // reciprocal of depth range |
| F32 B = Znear * A; | // minimum depth divided by depth range |

-continued

```
U32 idx = (depth * A - B) * pow(2,-149+size); // unsigned integer index
into lookup table
```

Here, the depth of a coarse pixel (fragment), "depth", is provided as a 32-bit floating point number by the Z depth and stencil test stage ("ZS") 308. The depths of the near and far planes of the view frustum are obtained as 32-bit floating point numbers from the appropriate descriptor. The size of the depth table is expressed as a 32-bit unsigned integer representing the size in terms of an exponent of a power of two.

The values "range", "A" and "B" are then calculated. As these values do not depend on primitive depth, they are constant for each viewport. As such, they are calculated once at the beginning of the render pass, stored locally, and used in each of one or more subsequent index determining operations.

In particular, in the present embodiment, the constants "range", "A" and "B" are calculated by an FMA unit as a small micro-code sequence as a starting step. This involves the value "range" first being calculated by the FMA unit performing a subtraction operation. "A" is then calculated by the FMA determining the reciprocal of the previous result ("range") using Newton-Raphson iteration. "B" is then calculated by the FMA multiplying the previous result ("A") by the value for "Znear".

An index, "idx", is then calculated by the FMA unit as a single FMA-scale operation, using the previously calculated constants. In particular, the term (depth*A−B) is calculated as a fused multiply-add (FMA) operation, and scaled by the lookup table size, 2^size. Calculating the index, "idx", as a 32-bit unsigned integer then has the effect of rounding down to the nearest integer.

Here, the value "−149" is used in the conversion from floating point to integer to take into account the maximum expressible exponent range of a 32-bit floating point number, as well as the range of the 23-bit mantissa. The bit-pattern produced by the floating point calculation is then the desired integer representation.

Figure 5:
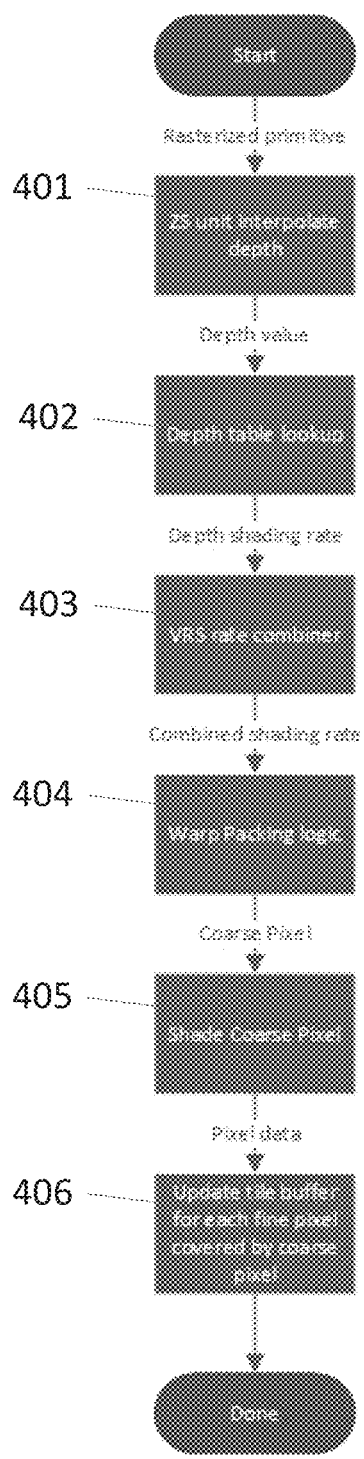
FIG. 5 is a flowchart illustrating a rendering process in accordance with an embodiment of the technology described herein.

FIG. 5 shows a method of operating the graphics processing pipeline 300 according to an embodiment. As shown in FIG. 5, at step 401 a fragment (rasterised primitive) generated by rasteriser 306 is subjected to a depth interpolation operation by the Z depth and stencil test stage ("ZS") 308 of the graphics processing pipeline 300. The depth interpolation operation determines a Z depth value for the fragment. This Z depth value may then be used by the Z depth and stencil test stage ("ZS") 308 to perform a Z depth test on the fragment.

At step 402, (assuming the fragment passes the Z depth test) the determined depth value is used by the depth shading rate lookup stage 309 to determine a shading rate that the fragment should be shaded according to based on its depth. This is done by looking up this "depth shading rate" in a depth lookup table based on the determined depth value.

At step 403, the shading rate determined on the basis of the fragment's depth is combined by the shading rate combiner stage 310 with other shading rates determined on the basis of other shading rate criteria, resulting in a "combined shading rate" that the fragment is to be shaded according to.

At step 404, this combined shading rate is used by the warp packing stage 312 to inform the process of generating a thread group ("warp"), which when executed by the execution engine ("EE") 314 will generate output pixel data for the fragment.

For example, in the case of a 1×1 shading rate, the warp packing unit 312 includes an execution thread in a thread group ("warp") that will produce output pixel data for the fragment alone. In present embodiment, however, a coarser shading rate is used, and the warp packing stage 312 accordingly includes an execution thread in a thread group ("warp") that will produce output data for the fragment together with one or more other fragments. In this case, the fragment will, in effect, be shaded as a "coarse pixel" that represents plural "fine pixels" (fragments).

At step 405, the execution thread representing the coarse pixel is executed by the execution engine ("EE") 314, to generate output pixel data for the coarse pixel.

At step 406, the generated pixel data is written to the tile buffer 318 in respect of each fine pixel that the coarse pixel represents. Accordingly, the same pixel data is used for plural fine pixels, thereby reducing the processing effort for those fine pixels.

It will be appreciated from the above that the technology described herein, in its embodiments at least, provides arrangements in which the processing required to generate a render output, e.g. frame for display, can be reduced. This is achieved, in the embodiments of the technology described herein at least, by determining a shading rate based on depth.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a graphics processor that comprises a rasteriser configured to rasterise primitives to generate fragments, and a renderer operable to render primitives to generate a render output using different shading rates, wherein the renderer is operable to render primitives by rendering fragments generated by the rasteriser, the method comprising:
   the rasteriser rasterising a primitive to generate a fragment to be rendered by the renderer;
   determining a depth value of the fragment generated from the primitive;
   determining a shading rate for rendering the fragment generated from the primitive based on the determined depth value of the fragment generated from the primitive;
   combining the shading rate determined based on the determined depth value of the fragment and at least one other shading rate for the fragment into a single combined shading rate for the fragment; and
   the renderer rendering the fragment generated from the primitive using the combined shading rate for the fragment.

2. The method of claim 1, comprising:
   performing a depth test on the fragment using the same depth value of the fragment that the shading rate for rendering the fragment is determined based on.

3. The method of claim 1, comprising:
providing information indicating a shading rate for each of plural predetermined depths or depth ranges;
wherein determining the shading rate for rendering the fragment is performed by determining the shading rate indicated by the information for the predetermined depth or depth range corresponding to the determined depth value of the fragment.

4. The method of claim 3, wherein the graphics processor comprises local storage, and the method comprises:
the graphics processor storing the information in the local storage;
wherein determining the shading rate for rendering the fragment is performed using the information stored in the local storage.

5. The method of claim 3, wherein the information comprises an array of data elements, each data element indicating a shading rate for a respective predetermined depth or depth range and associated with a respective index value; and
wherein determining the shading rate for rendering the fragment is performed by:
determining an index value from the determined depth value of the fragment; and
retrieving the shading rate from the data element of the array of data elements associated with the index value determined from the determined depth value of the fragment.

6. The method of claim 5, wherein the graphics processor comprises one or more functional units operable to perform fused multiply-add (FMA) operations; and
wherein determining the index value from the determined depth value of the fragment is performed by:
one of the one or more functional units performing a single fused multiply-add (FMA) operation to determine the index value from the determined depth value of the fragment.

7. The method of claim 6, comprising one of the one or more functional units determining one or more constants for use in the single fused multiply-add (FMA) operation.

8. The method of claim 1, wherein the renderer comprises a programmable processing stage operable to execute execution threads, and a thread group generating stage operable generate thread groups comprising execution threads for execution by the programmable processing stage; and wherein the renderer rendering the fragment generated from the primitive using the combined shading rate comprises:
the thread group generating stage generating a thread group comprising execution threads for execution by the programmable processing stage based on the combined shading rate used; and
the programmable processing stage executing the execution threads in the thread group.

9. The method of claim 1, wherein the renderer rendering the fragment generated from the primitive using the combined shading rate comprises the renderer producing output rendered data; and wherein the method comprises:
writing the output rendered data to storage based on the combined shading rate used.

10. A graphics processor comprising:
a rasteriser circuit configured to rasterise primitives to generate fragments;
a renderer circuit operable to render primitives to generate a render output using different shading rates, wherein the renderer circuit is operable to render primitives by rendering fragments generated by the rasteriser circuit;
a shading rate determining circuit configured to determine a shading rate for rendering a fragment generated from a primitive by the rasteriser circuit based on a depth value of the fragment generated from the primitive; and
a combining circuit configured to combine a shading rate determined based on a depth value of a fragment by the shading rate determining circuit and at least one other shading rate for the fragment into a single combined shading rate for the fragment;
wherein the renderer circuit is configured to render a fragment generated from a primitive using a combined shading rate for the fragment determined by the combining circuit.

11. The processor of claim 10, comprising a depth testing circuit configured to use a depth value of a fragment to perform a depth test on the fragment;
wherein the shading rate determining circuit is configured to determine a shading rate for rendering a fragment based on a same depth value of the fragment that is used by the depth testing circuit to perform a depth test on the fragment.

12. The processor of claim 10, wherein the shading rate determining circuit is configured to determine a shading rate for rendering a fragment using information indicating a shading rate for each of plural predetermined depths or depth ranges.

13. The processor of claim 12, wherein the graphics processor comprises local storage, and the information is stored in the local storage.

14. The processor of claim 12, wherein the information comprises an array of data elements, each data element indicating a shading rate for a respective predetermined depth or depth range and associated with a respective index value; and wherein:
the shading rate determining circuit is configured to determine a shading rate for rendering a fragment based on a depth value of the fragment by:
determining an index value from the depth value of the fragment; and
retrieving the shading rate from the data element of the array of data elements associated with the index value determined from the depth value of the fragment.

15. The processor of claim 14, wherein the shading rate determining circuit comprises one or more functional units operable to perform fused multiply-add (FMA) operations; and wherein:
the shading rate determining circuit is configured to determine an index value from the depth value of the fragment by:
one of the one or more functional units performing a single fused multiply-add (FMA) operation to determine the index value from the depth value of the fragment.

16. The processor of claim 15, wherein the shading rate determining circuit is configured to determine an index value by one of the one or more functional units determining one or more constants for use in the single fused multiply-add (FMA) operation.

17. The processor of claim 10, wherein the renderer circuit comprises a programmable processing circuit operable to execute execution threads, and a thread group generating circuit operable generate thread groups comprising execution threads for execution by the programmable processing circuit; and wherein the renderer circuit is configured to render a fragment generated from a primitive using a combined shading rate by:

the thread group generating circuit generating a thread group comprising execution threads for execution by the programmable processing circuit based on the combined shading rate used; and the programmable processing stage executing the execution threads in the thread group.

18. A non-transitory computer readable storage medium storing software code which when executing on a processor performs a method of operating a graphics processor that comprises a rasteriser configured to rasterise primitives to generate fragments, and a renderer operable to render primitives to generate a render output using different shading rates, wherein the renderer is operable to render primitives by rendering fragments generated by the rasteriser, the method comprising:

the rasteriser rasterising a primitive to generate a fragment to be rendered by the renderer;

determining a depth value of the fragment generated from the primitive;

determining a shading rate for rendering the fragment generated from the primitive based on the determined depth value of the fragment generated from the primitive;

combining the shading rate determined based on the determined depth value of the fragment and at least one other shading rate for the fragment into a single combined shading rate for the fragment; and the renderer rendering the fragment generated from the primitive using the combined shading rate for the fragment.

* * * * *